United States Patent Office 2,882,204
Patented Apr. 14, 1959

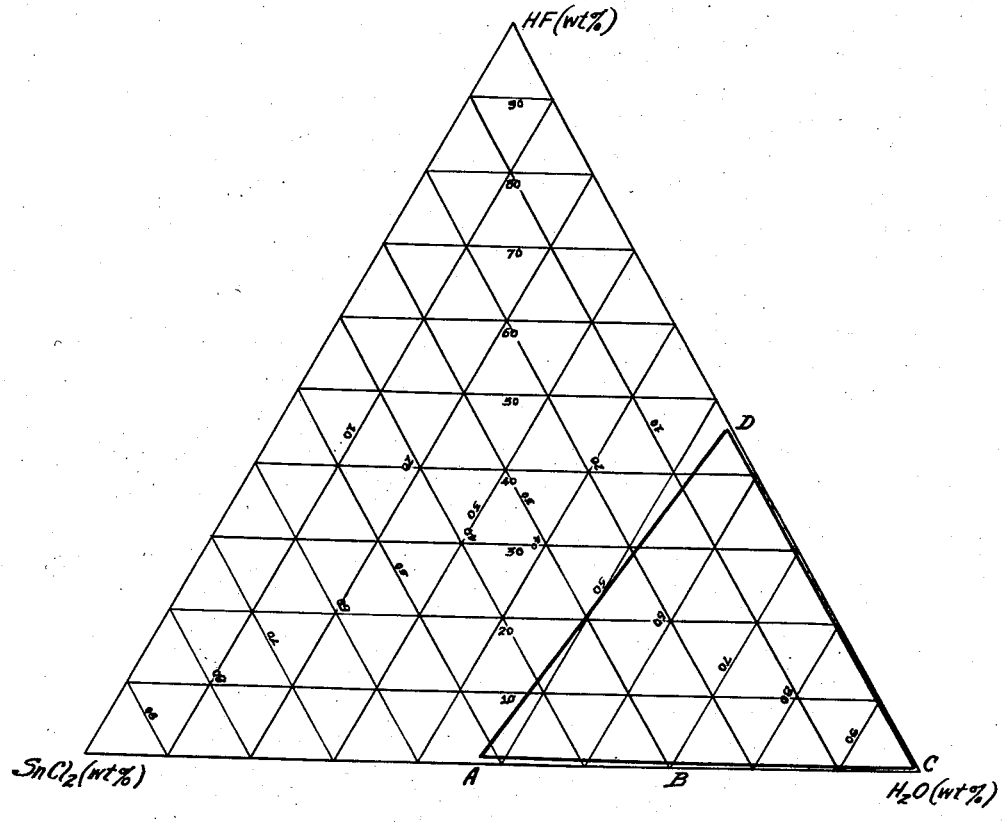

2,882,204

DISTANNOUSMONOCHLOROTRIFLUORIDE AND DENTIFRICE COMPOSITIONS THEREWITH

William H. Nebergall, Bloomington, Ind., assignor to Indiana University Foundation, Bloomington, Ind., a corporation of Indiana Application May 31, 1955, Serial No. 511,833

7 Claims. (Cl. 167—93)

This invention relates to a new composition of matter. More particulary it relates to the compound tin (II) monochlorotrifluoride (distannousmonochlorotrifluoride), having the formula $Sn_2ClF_3$ ($SnCl_2 \cdot 3SnF_2$) and to a method for its preparation. It further relates to compositions of matter containing this compound and suitable for application to the teeth.

Although it is commonly recognized that the introduction of small amounts of fluorine into drinking water has a pronounced effect in reducing the occurrence of dental caries, this method of providing fluorine is not feasible where drinking water is obtained from small private sources such as individual wells, etc. rather than from a common public source. Further, the addition of fluorine to common public sources is not always accepted or permitted.

Topical applications of aqueous fluoride solutions to an individual by a dentist provide an excellent measure of protection. However, such treatment is time consuming and expensive, and, thus, is not always available to all persons desiring it. One of the most practicable methods of administering fluorine lies in the use of a dentifrice composition.

It has now been found that a new compound can be prepared containing tin (II) and fluorine in combination with chlorine, which is useful in reducing dental caries when applied topically in aqueous solutions or in a dentifrice.

The compound may be further used as a mordant in the dyeing of fabrics, in glass making and ceramics, in tin electro-plating, and as an intermediate in the synthesis of organotin compounds.

Accordingly, one of the objects of this invention is to provide a method for preparing a new and novel compound.

A further object is to provide compositions of matter containing this compound.

Another object is to provide novel compositions of matter suitable for application to the teeth and which will reduce the rate of formation of dental caries.

A further object is to provide dentifrice compositions which may be easily and safely used by humans, and which will significantly reduce the formation of dental caries.

Other objects and advantageous features will be obvious from the following detailed description and drawing in which the triangular diagram defines the compositions of aqueous solutions from which tin (II) monochlorotrifluoride crystals can be formed.

Tin (II) monochlorotrifluoride forms colorless octahedrally-shaped crystals melting at a temperature of 179 to 181° C.

In general tin (II) monochlorotrifluoride may be prepared by reacting hydrogen fluoride with tin (II) chloride in aqueous solution. After reaction, crystals of the compound are formed, although it may be necessary to cool or use other methods known in the art to form the crystals.

The preferred concentrations of components of the reaction mixture at the time of the start of crystallization of the compound are shown by the area ABCDA of the figure. The crystals formed from this range of materials will be substantially entirely tin (II) monochlorotrifluoride.

The tin (II) chloride used in the preparation of the compound may be either anhydrous or in the hydrate form. Also, the hydrogen fluoride may be supplied either as a gas or in aqueous solution as hydrofluoric acid. However, the total proportion of water, whether present as water of hydration or as solvent for the hydrogen fluoride or the reaction mixture must not be less than the limits as defined by the line AD of the figure.

The tin (II) chloride salt used may be combined with the hydrogen fluoride either in salt form or in solution, so long as the crystal formation takes place within the composition ranges as heretofore set forth. If solvents other than water are used, they must be selected so as to introduce no undesirable reactants or contaminants.

The temperature at which the reaction takes place is not critical except that the application of heat may be desirable to dissolve the tin (II) chloride and thus hasten the reaction. Also, the use of a minimum amount of water in the solution will facilitate crystallization of the tin (II) monochlorotrifluoride.

The tin (II) chloride may be formed in situ in the reaction mixture. For example, tin (II) oxide may be combined with chlorine under proper reaction conditions.

Tin (II) monochlorotrifluoride can also be prepared by combining solutions of $SnCl_2 \cdot 2H_2O$, $SnF_2$ and $HCl$ and also by combining solutions of $SnF_2$ and $HCl$. It is to be understood that any of the foregoing and other equivalent reactants are to be included in the scope of this invention as long as the composition at the start of crystallization is equivalent to that defined in the figure.

Since stannous salts are easily oxidized, it may be desirable to use oxygen-free water in preparing the aqueous solutions to prevent the formation of stannic salts which could form insoluble compounds. It may also be desirable to protect the reacting materials from the air by keeping them under some inert or reducing gas such as nitrogen, hydrogen, etc. However, since the contamination would be slight, these precautions will not be necessary where small amounts of impurities can be tolerated.

The following example illustrates the preparation of the compound with greater particularity.

*Example I*

A 74 g. sample of $SnCl_2 \cdot 2H_2O$ was dissolved in 50 g. of water in a 200 ml. polyethylene beaker, and the solution was heated to 60° C. A 13.7 g. portion of 48.5% aqueous HF was first heated to 60° C. in a polyethylene beaker and then mixed with the aqueous solution of $SnCl_2$. The mixture was set aside to cool to room temperature, and upon cooling a crop of colorless octahedrally-shaped crystals formed. The mother liquor was decanted and the crystals were washed twice with an alcohol-ether mixture (1:3). The crystals were then dried in an evacuated desiccator over magnesium perchlorate.

*Analysis.*—Calcd. for $Sn_2ClF_3$: Sn, 71.97%; F, 17.30%. Found: Sn, 71.9%; F, 15.71%.

Tin (II) monochlorotrifluoride in aqueous solution is an excellent material for topical application to the teeth. Very satisfactory results can be obtained using concentrations of from 0.0058% up to saturation. The following example illustrates the efficacy of an aqueous solution when tested for its ability to reduce enamel solubility in whole teeth.

Example II

Whole teeth are exposed to irradiation by neutron bombardment whereby some of the phosphorus in the calcium hydroxyapatite of the enamel is transformed to $\beta$-emitting $P^{32}$. The tooth is exposed to a sodium lactate-lactic acid etching solution. The amount of enamel etched from the tooth can be counted and the reduction in radioactivity of the etching solution used with a tooth will be proportional to the reduction in enamel solubility.

Teeth treated with an aqueous solution containing tin (II) monochlorotrifluoride in an amount equivalent to 1000 p.p.m. of $F^-$ showed a reduction of 65.2% in enamel solubility as compared to the tooth before treatment.

The use of aqueous solutions of tin (II) monochlorotrifluoride will reduce caries formation. However, it will be obvious that aqueous solutions for topical application containing large amounts of fluorine may be toxic if swallowed and must be used with care.

As has been heretofore pointed out, tin (II) monochlorotrifluoride can be incorporated in a dentifrice composition and will produce very good results in reduction of caries formation when applied to the teeth in this type of medium.

One of the most commonly used dentifrice forms is toothpaste, and tin (II) monochlorotrifluoride can be conveniently included as an active material in a toothpaste.

Example III

A toothpaste containing about 1000 p.p.m. $F^-$ was prepared having the following formula:

| | Percent |
|---|---|
| Sodium carboxymethylcellulose | 1.10 |
| Magnesium aluminum silicate | 0.40 |
| Humectants | 30.00 |
| Calcium pyrophosphate | 40.00 |
| Tin (II) monochlorotrifluoride | 0.58 |
| Sodium coconut monoglyceride sulfonate | 0.81 |
| Lauryl alcohol sulfate | 0.70 |
| Flavor and sweetening | Q.s. |
| Water | Balance |

Teeth treated with a slurry made from this toothpaste showed an average reduction in enamel solubility of 40.1%.

In dentifrice compositions it is preferred to use from 0.0058% to 2.32% of tin (II) monochlorotrifluoride, while especially good results are obtained using from 0.145% to 0.58%.

While specific examples of dentifrice materials have been set forth, it is to be understood that they are illustrative only and that the invention is not to be limited thereto.

What is claimed is:

1. The method of making distannousmonochlorotrifluoride which comprises mixing $SnCl_2$, $H_2O$ and HF in the proportions defined by the area ABCDA of the figure, and forming distannousmonochrolotrifluoride from said mixture by crystallization.

2. A composition of matter useful in the treatment of teeth comprising an aqueous solution containing distannousmonochlorotrifluoride.

3. A composition of matter useful in the treatment of the teeth comprising an aqueous solution containing from 0.0058% to saturation of distannousmonochlorotrifluoride.

4. A dentifrice containing distannousmonochlorotrifluoride.

5. A toothpaste containing distannousmonochlorotrifluoride.

6. A toothpaste containing from 0.0058% to 2.32% distannousmonochlorotrifluoride.

7. Distannousmonochlorotrifluoride.

References Cited in the file of this patent

UNITED STATES PATENTS

| | | |
|---|---|---|
| 1,943,856 | Cross | Jan. 16, 1934 |
| 2,689,170 | King | Sept. 14, 1954 |
| 2,694,616 | Wainer | Nov. 16, 1954 |
| 2,717,197 | Brown | Sept. 6, 1955 |

OTHER REFERENCES

Hoffmann: Dictionary of the Inorganic Compounds, Leipzig, 1919, Band 1, No. 39, p. 1448 ($SnF_2Cl_2$).